United States Patent

[11] 3,607,570

| [72] | Inventors | Joachim Hildebrandt<br>Hattersheim/Main;<br>Oskar Kunze, Langenhein/Taunus, both of<br>Germany |
|---|---|---|
| [21] | Appl. No. | 681,224 |
| [22] | Filed | Nov. 7, 1967 |
| [45] | Patented | Sept. 21, 1971 |
| [73] | Assignee | Farbwerke Hoechst Aktiengesellschaft<br>vormals Meister Lucius & Bruning<br>Frankfurt/Main, Germany |
| [32] | Priority | Nov. 12, 1966 |
| [33] | | Germany |
| [31] | | F 50663 |

[54] APPARATUS FOR WELDING ARTICLES MADE OF THERMOPLASTIC MATERIALS
2 Claims, 1 Drawing Fig.

[52] U.S. Cl. .................................................. 156/500, 156/497
[51] Int. Cl. .................................................. B29b 3/02, B29b 5/04, B32b 31/30

[50] Field of Search ........................................ 156/546, 544, 242, 304, 497, 500; 18/3.5, 30

[56] References Cited
UNITED STATES PATENTS

| 2,372,737 | 4/1945 | Phillips .......................... | 156/497 |
| Re.24,801 | 3/1960 | Kaminsky ...................... | 156/497 |
| 3,138,511 | 6/1964 | Cadwallader .................. | 156/500 X |
| 3,154,811 | 11/1964 | Gardener ...................... | 18/3.5 X |
| 3,421,964 | 1/1969 | Arbit ............................ | 156/500 X |
| 3,206,125 | 9/1965 | Farrell .......................... | 222/146 HE |
| 3,271,223 | 9/1966 | Sudo ............................ | 156/500 |

Primary Examiner—Benjamin A. Borchelt
Assistant Examiner—Jerald J. Devitt
Attorney—Connolly & Hutz ABSTRACT: Thick-walled articles made of thermoplastic materials are welded by means of a welding apparatus comprising a screw extruder, a heated flexible conduit, a heated mouthpiece and a guiding device.

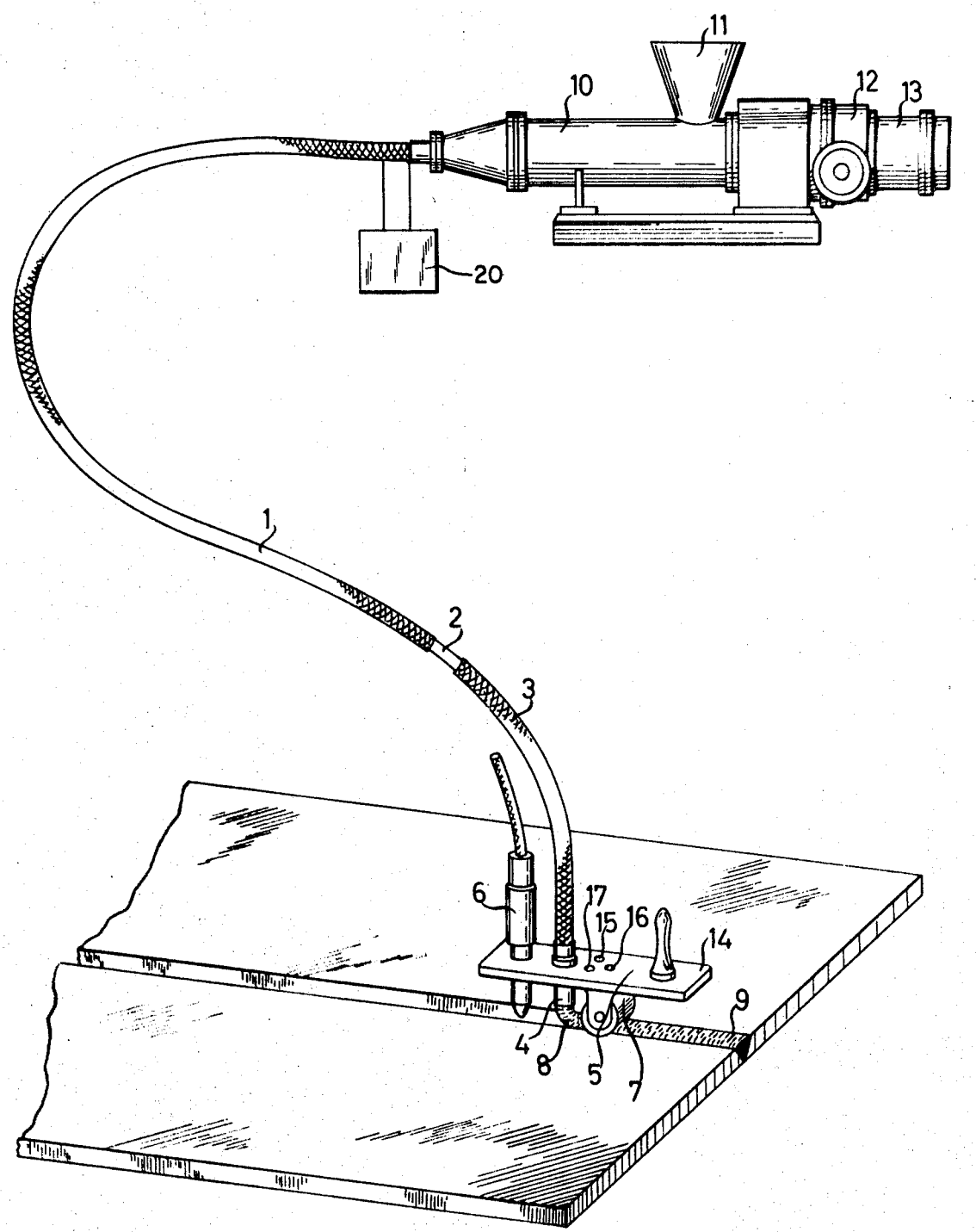
INVENTORS
JOACHIM HILDEBRANDT
OSKAR KUNZE
BY Connolly and Hutz
their ATTORNEYS

APPARATUS FOR WELDING ARTICLES MADE OF THERMOPLASTIC MATERIALS

The present invention provides an apparatus for welding articles made of thermoplastic materials.

As in the field of welding metals, welding thermoplastic materials also means joining parts while applying heat and pressure and adding a filler material. Welding itself is effected by means of an electrically or gas heated torch which plasticizes the seam to be welded and a filler bead of plastic material. Owing to the poor thermal conduction of plastic materials, it is difficult to plasticize the beads uniformly and, thus, considerable differences in temperature over the bead section are the result. For example, the thermal conductivity of polyvinyl chloride is about 350 times less than that of steel. Thus, it can be observed that, although the surface of the filler bead is heated to its decomposition temperature, the core of the bead is still insufficiently plasticized. It is therefore inevitable that tensions in the weld occur because of the high linear thermal expansion of the plastic materials.

For these reasons, the diameter of the beads is limited to about 5 millimeters. For joining thick-walled parts, several beads have, therefore, to be superposed, the beads or bead turns having to be welded separately. An apparatus of this kind using a filler bead only permits thick-walled parts to be joined conditionally; it is suitable for welding thin-walled articles.

There is also known an extruding gun by means of which the welding material is applied to the seam. The gun is generally loaded with cylindrical prefabricated cartridges of plastic materials. After the cartridges have been plasticized in the gun by heating, the plastic mass is pressed as a thin bead onto the seam by means of a lever acting on a piston; during The welding process, the orifice of the gun runs along the seam and plasticizes the surface thereof. Sheets or thin plates of plastic material can be welded by means of this device. For this effect, it is necessary that the shape of the orifice corresponds to the weld and that, prior to the welding process, a special activator is applied to the welding marks to assure a sufficient bond.

Being of a reasonable size, a gun of this kind can also only be used for welding thin-walled articles because of its limited capacity, the force to be applied and the batchwise discharge of the material. Filling and refilling the gun chamber is rather complicated and time consuming: quite a number of manipulations is necessary for handling the gun and time is wasted by waiting for every set of cartridges to become completely plasticized. The usual thickness of a welding material bead is about 2 millimeters and, when orifices of a larger diameter are used, it is about 3 millimeters.

For joining thick-walled articles, for example articles having a wall thickness exceeding 10 millimeters, considerably thicker welding material beads are necessary. A chamber load of such a gun would only be sufficient for a weld having a length of a few centimeters. An industrial use of this device would no longer be reasonable with said wall thicknesses. In practice, however, for example when laying sewage pipes or installing sewage sinks, articles having a wall thickness of 40 millimeters and more are, in many cases, to be welded.

The present invention provides an apparatus suitable for welding articles made of thermoplastic materials and having a wall thickness exceeding 10 millimeters, which comprises a screw extruder, a controllably heated flexible conduit, a controllably heated mouthpiece and a guiding device.

The apparatus of the invention permits to produce welding material beads having the desired thickness. The length of the bead is unlimited. The welding material is not only plasticized but also thoroughly kneaded. There are no differences in temperature within the bead section. Even when the mass bead is considerably bulged or twisted during the welding of the seam, no additional tensions occur while the weld is cooling. Only little strength is needed for handling the apparatus and the apparatus itself only requires little room for being placed. It can also be used under confined space conditions, for example in a trench.

For welding in workshops or similar rooms, the mouthpiece may be positioned in a stationary handling piece and the seam can be passed along under the mouthpiece. For welding irregular seams or pipes, it is, in most cases, necessary or advantageous to operate with a movable mouthpiece. In these cases, the flexibility and the weight of the heated conduit are especially important for the welding process.

From this point of view, it is advantageous to use an apparatus whose flexible conduit comprises a core made of a heat-resistant plastic material and an armoring made of an electrically conductive fabric.

The core of the conduit may consist of a polytetrafluoroethylene pipe and the armoring of a metal fabric. The polytetrafluoroethylene stands the occurring temperatures and has good sliding properties. The metal fabric may be connected in known manner to a high-current generator while interconnecting a regulator, thus also serving as a heating element. The guiding device may be a heat-insulated handle.

More useful than a simple handle is a guiding device which comprises a heating element for heating the seam joint and a thrustpiece for pressing the strand onto the joint. The weld can be produced singlehanded with the help of such a device.

The heating element positioned in the guiding device may be a heating iron which is arranged in front of the mouthpiece and which is passed therewith along the joint. The guiding device may, however, also be provided with a hot gas generator as the heating element; in many cases, this may be an advantage since, unlike the heating iron, it can be used without regarding the shape of the weld.

The hot gas generator, also referred to as burner, may be conducted in front of the mouthpiece independently of the guiding device. By combining the mouthpiece, the burner and the thrustpiece with the guiding device, it is, however, easier to maintain constant distances between these parts of the device. The distance between the weld and the device is restricted to a minimum by means of the thrustpiece.

Welding by means of the apparatus of the invention is described in detail in the following example.

EXAMPLE

A pipesocket having a wall thickness of 20 millimeters was welded to a sewage sink having a wall thickness of 40 millimeters. Both parts consisted of polyethylene. The sink had already been installed. The welding process had, therefore, to be carried out from the pipe trench.

For preparing the welding, the pipe socket was introduced into the corresponding recess of the sink, the socket protruded about 15 millimeters into the sink. The auxiliaries necessary for the welding process were placed in a lorry parked near the pipe trench, which held the connections for the electric heating.

Granules of a plastic material corresponding to the polyethylene used for the sink and the pipe, were fed into the feeding funnel of a screw extruder. The screw mixed and kneaded the granules under supply of heat and processed them into a perfectly plasticized mass which had a temperature of about 230° C. at the outlet of the extruder. The mass was transported at a rate of about 30 cc. per minute under the pressure of the extruder through a flexible conduit having an inside diameter of 20 millimeters and heated to 230° C. by a high current, and through a mouthpiece having an inside diameter of about 18 millimeters and heated to the same temperature and it was then pressed onto the heated outer and inner joints by means of a thrustpiece. For producing the outer, slightly thicker weld, the mass stream was a little bulged. The medium welding efficiency was about 10 centimeters per minute.

The screw extruder used for mixing, kneading and plasticizing the material was electrically heated; the output could be regulated to values in the range of from 15 to 35 cc. per minute by means of a speed gear. The flexible conduit had a length of 2.5 meters; the core consisted of a pipe of polytetrafluoroethylene and the armoring of a stainless steel fabric. The joints were heated by means of an electrically heated burner which was adjustably fixed on a handling ledge together with the mouthpiece of the conduit and a shoe-shaped thrustpiece. The handling ledge also carried control lamps for the various heating circuits.

An apparatus of the same type can be used for welding, in addition to articles made of the various polyethylenes, articles made of polypropylene, polyvinyl chloride and the weldable modifications thereof. Care has only to be taken that the heating temperatures are adjusted to the thermal properties, especially the welding range, of the plastic materials and that, in any case, they are less than their decomposition temperatures.

An apparatus of the invention is illustrated diagrammatically by way of example in the accompanying drawing. Referring to the drawing, the figure shows a total view of the apparatus in operation on a plastic sheet section.

A flexible conduit 1 comprising a core 2 and an armoring 3 heated by heating means (20) and carries at its outlet a mouthpiece 4 which is positioned in a guiding device 5. The guiding device also carries a burner 6 and is linked to a roller-type thrustpiece 7. The filler material leaving the mouthpiece 4 is indicated by 8 and the finished weld is indicated by 9.

As illustrated in the drawing guiding device 5 acts as a common mounting member for mouthpiece 4, burner 6, and thrustpiece 7.

The inlet end of the flexible conduit 1 is attached to a screw extruder 10. The extruder has a feeding funnel 11 and is driven by an electromotor 13 via a speed gear 12.

For simplification's sake, only control lamps 15, 16 and 17 installed on a handling ledge 14 are shown.

I claim:

1. An apparatus for welding articles made of thermoplastic materials, which comprises a screw extruder for thermoplastic filler material, a flexible conduit attached to the extruder and having a mouthpiece, means associated with the conduit for heating the flexible conduit to heat the filler material therein, a heating element adjacent the outlet of the mouthpiece for heating the seam joint, and a guiding device disposed adjacent the outlet of the mouthpiece.

2. The welding apparatus of claim 1 wherein the mouthpiece is fixed to the guiding device, a thrust element for pressing on the bead of filler material emitted from the mouthpiece into the seam joint, the guiding device being a common mounting member for the mouthpiece and the thrust element and the heating element, the flexible conduit being a core made of a heat resistant plastic material, and the heating means therefor being an armoring around the core and made of an electrically conductive fabric.